(No Model.)
G. A. SMYTH.
STOPPER FOR BOTTLES, JARS, &c.
No. 254,718. Patented Mar. 7, 1882.
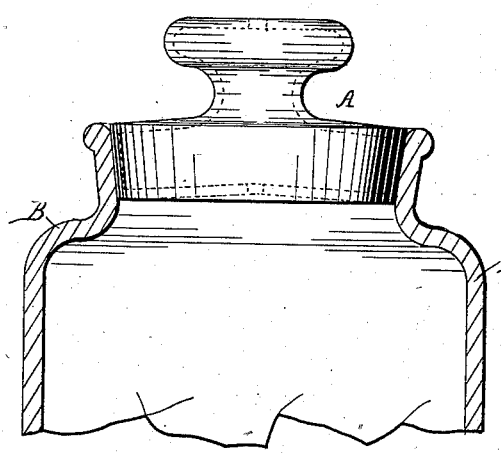
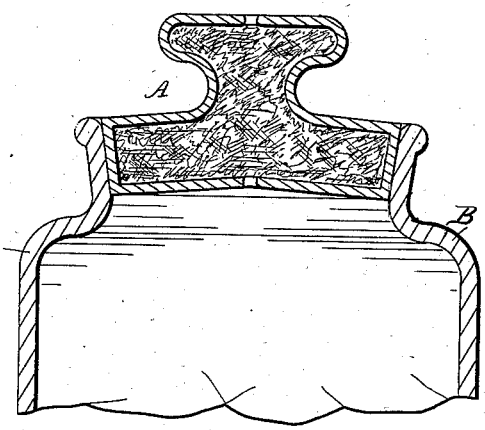

UNITED STATES PATENT OFFICE.

GEORGE A. SMYTH, OF NEWPORT, RHODE ISLAND.

STOPPER FOR BOTTLES, JARS, &c.

SPECIFICATION forming part of Letters Patent No. 254,718, dated March 7, 1882.

Application filed December 31, 1881. (No model.)

*To all whom it may concern:*

Be it known that I, GEORGE A. SMYTH, a citizen of the United States, residing at Newport, in the county of Newport and State of Rhode Island, have invented certain new and useful Improvements in Stoppers for Bottles, Jars, &c.; and I do declare the following to be a full, clear, and exact description of the invention, such as will enable others skilled in the art to which it appertains to make and use the same, reference being had to the accompanying drawings, and to the letters and figures of reference marked thereon, which form a part of this specification, and in which—

Figure 1 is a side elevation of my improved stopper applied to a jar; Fig. 2, a vertical section through the same.

This invention relates to an improvement on my stopper shown in the Patent No. 248,360, dated October 18, 1881; and it consists mainly in the peculiar construction hereinafter explained, and then pointed out more particularly in the claim.

In the form shown in the drawings, A represents the body of the stopper, which is preferably made of blown glass, and fitted by grinding into the jar B with which it is to be used, so as to make an air-tight fit between the stopper and the jar, or what is commonly termed a "ground joint." Instead of the sinuous opening described in my aforesaid Patent No. 248,360, the stopper has a direct passage through it, which may form a large chamber adapted to receive a considerable portion of asbestus, mineral wool, or any suitable filtering substance, which may or may not be mixed with a little antiseptic material, as preferred.

The advantages of my improvement are these: Heretofore, although obviously very desirable, it has been practically impossible to use glass stoppers having ground joints for the ordinary process of preserving fruit, &c., because when jars having such joints are sealed when hot, as is necessary in the usual process of preserving, the pressure caused by the condensation of the steam and the shrinking of the inclosed material in cooling would force the stopper into the mouth of the jar so tightly that it could not be opened. To avoid this difficulty it has generally been the custom heretofore to make preserve-jars with loosely-fitting covers or stoppers, and to provide them with rubber gaskets to make tight joints, and in most cases such jars required fastenings of various kinds to keep the covers or stoppers in place. These rubber gaskets and fastenings, particularly the former, are very objectionable for obvious reasons; but heretofore it has been found very difficult in the ordinary process of preserving fruit to use glass covers or stoppers without them; but by my improvement they can be dispensed with, as the stopper can be set in its place while the material is hot, or the material can be put in cold and heated, or even brought to the boiling-point in the jar with the stopper in, as the steam will pass through the filter, and the condensation caused by cooling will not jam the stopper tight, because the air can readily pass through the filter, although the germs producing deleterious results will be prevented from passing into the interior of the jar owing to the filtering medium in the chamber.

I do not limit myself to the exact form of chamber herein described, as any other form communicating with both inside and outside of the jar, and adapted to receive filtering material, may be used.

I do not wish to be understood as claiming a glass stopper having a ground joint, as I am of course aware that such stoppers are very commonly used; nor do I claim broadly a stopper having a passage through it and filtering material therein. Neither do I claim a ground stopper having an interior passage to allow the outward flow of liquid from the vessel with which it is used, and with a side opening to allow the inward passage of air, my invention being limited to a jar having a stopper provided with a ground joint, and with a chamber containing filtering material, which chamber has upper and lower openings, so as to allow free passage of vapor from and air into the interior of the jar, and at the same time to prevent access of germs of decay.

What I claim is—

In combination with the jar or bottle B, the blown stopper A, ground to fit said jar, and provided with an interior chamber containing filtering material, and having upper and lower openings, whereby vapor can pass from or air into the interior of the jar without allowing the admission of germs of decay, substantially as described, and for the purpose specified.

In testimony whereof I affix my signature in presence of two witnesses.

GEORGE ADAMS SMYTH.

Witnesses:
C. H. BLODGETT,
E. B. TAFT.